United States Patent
Chron et al.

(10) Patent No.: US 7,953,705 B2
(45) Date of Patent: *May 31, 2011

(54) AUTONOMIC RETENTION CLASSES

(75) Inventors: Edward G. Chron, Sunnyvale, CA (US); Joseph P. McCloskey, Columbia, MD (US); David A. Pease, Redwood Estates, CA (US); Elizabeth S. Richards, Columbia, MD (US); Sandeep M. Uttamchandani, San Jose, CA (US)

(73) Assignees: International Business Machines Corporation, Armonk, NY (US); National Security Agency, Ft. George G. Meade, MD (US)

( * ) Notice: Subject to any disclaimer, the term of this patent is extended or adjusted under 35 U.S.C. 154(b) by 576 days.

This patent is subject to a terminal disclaimer.

(21) Appl. No.: 12/059,136

(22) Filed: Mar. 31, 2008

(65) Prior Publication Data

US 2008/0222225 A1    Sep. 11, 2008

Related U.S. Application Data

(63) Continuation of application No. 11/681,955, filed on Mar. 5, 2007, now Pat. No. 7,552,131.

(51) Int. Cl.
*G06F 7/00* (2006.01)
(52) U.S. Cl. ........ 707/662; 707/663; 707/667; 707/689; 707/696
(58) Field of Classification Search .................. 707/709, 707/748, 662, 663, 667, 689, 696; 706/12; 711/100
See application file for complete search history.

(56) References Cited

U.S. PATENT DOCUMENTS

| | | | |
|---|---|---|---|
| 6,571,225 B1 * | 5/2003 | Oles et al. | 706/12 |
| 7,024,404 B1 | 4/2006 | Gerasoulis et al. | |
| 7,028,026 B1 | 4/2006 | Yang et al. | |
| 7,321,890 B2 * | 1/2008 | Tropf | 707/756 |
| 7,672,943 B2 * | 3/2010 | Wong et al. | 707/709 |
| 7,716,226 B2 * | 5/2010 | Barney | 707/748 |
| 2004/0153468 A1 | 8/2004 | Paila et al. | |
| 2004/0220944 A1 | 11/2004 | Behrens et al. | |
| 2005/0014486 A1 | 1/2005 | Shimizu et al. | |
| 2005/0097260 A1 * | 5/2005 | McGovern et al. | 711/100 |
| 2005/0120013 A1 | 6/2005 | Chang et al. | |

(Continued)

OTHER PUBLICATIONS

Bruinshoofd, et al., "Comovement of Sales, Retention Practice and Financing Constraints in Dutch Manufacturing," Feb. 28, 2001, 40 pages total.
Chron et al., U.S. Appl. No. 11/681,955, Notice of Allowance, Dec. 17, 2008, 4 pages.

*Primary Examiner* — Thuy N Pardo
(74) *Attorney, Agent, or Firm* — Gibb I.P. Law Firm, LLC

(57) ABSTRACT

The embodiments of the invention provide methods, computer program products, etc. for autonomic retention classes when retaining data within storage devices. More specifically, a method of determining whether to retain data within at least one storage device begins by storing data items in at least one storage device. Furthermore, the method maintains access statistics for each of the data items, an age of each of the data items, and an administrator-defined importance value of each of the data items. Following this, a retention value is calculated for each of the data items based on the access statistics for each of the data items, the age of each of the data items, and the administrator-defined importance value of each of the data items.

17 Claims, 6 Drawing Sheets

U.S. PATENT DOCUMENTS

2005/0256832 A1 11/2005 Zhang et al.
2006/0015529 A1 1/2006 Yagawa
2006/0075007 A1 4/2006 Anderson et al.
2006/0173556 A1* 8/2006 Rosenberg ................. 700/3

* cited by examiner

```
typedef struct StatsHdr
{
    u64_t  app_class;    // application classification
    u64_t  app_id;       // application identification
    i32_t  numEntries;   // number of Stats entries in this record
    time_t StartTime;    // start time
    time_t EndTime;      // end time
}
StatsHdr_t;
/*
 * Library STG Statistics
 * ---------------------
 *
 * Collected continuously. recorded periodically by timer.
 *
 */
typedef struct Stats
{
    i32_t rcid;
    i32_t attrReads;
    i32_t attrWrites;
    i32_t changeFroms;
    i32_t changeTos;
    i32_t creates;
    i32_t createAs;
    i32_t deletes;
    i32_t deleteAs;
    i32_t derives;
    i32_t reads;
    i32_t missAttrReads;
    i32_t missAttrWrites;
    i32_t missChanges;
    i32_t missCreates;
    i32_t missCreateAs;
    i32_t missDeletes;
    i32_t missDeleteAs;
    i32_t missDerives;
    i32_t missReads;
    i64_t attrChangeSize;
    i64_t attrDeleteSize;
    i64_t attrReadSize;
    i64_t attrWriteSize;
    i64_t changeSize;
    i64_t createSize;
    i64_t deleteSize;
    i64_t deriveSize;
    i64_t readSize;
    i64_t missAttrChangeSize;
    i64_t missAttrDeleteSize;
    i64_t missAttrReadSize;
    i64_t missAttrWriteSize;
    i64_t missChangeSize;
    i64_t missCreateSize;
    i64_t missDeleteSize;
    i64_t missDeriveSize;
    i64_t missReadSize;
}
Stats_t;
/*
 * STG Statistics Table
 * --------------------
 *
 * 100 stats entries : value 0 to 99
 *
 */
#define StatsTableRange 100
typedef struct StatsTable
{
    struct Stats rcid[StatsTableRange];
    i64_t  ops[StatsTableRange];
}
StatsTable_t;
extern i32_t STG_StatClose();
extern i32_t STG_StatFlush();
extern i32_t STG_StatInit(i32_t *ptr_error); extern i32_t STG_StatStart();
extern i32_t stg_StatHitRead(const size_t * const ptrAttrLen,
            const size_t * const ptrDataLen,
            const retain_t retain);
extern i32_t stg_StatMissRead(const size_t * const ptrAttrLen,
            const size_t * const ptrDataLen,
            const retain_t retain);
extern i32_t stg_StatHitCreate(const size_t attrLen, const size_t dataLen,
            const retain_t retain);
extern i32_t stg_StatMissCreate(const size_t attrLen, const size_t dataLen,
            const retain_t retain);
extern i32_t stg_StatHitAsCreate(const retain_t retain); extern i32_t stg_StatMissAsCreate(const retain_t retain);
extern i32_t stg_StatHitAsDelete(const retain_t retain); extern i32_t stg_StatMissAsDelete(const retain_t retain);
extern i32_t STG_StatTimerFlush();
```

FIG. 3

AUTONOMIC RETENTION CLASSES

CROSS-REFERENCE TO RELATED APPLICATIONS

This application is a continuation of U.S. application Ser. No. 11/681,955 filed Mar. 5, 2007, the complete disclosure of which, in its entirety, is herein incorporated by reference.

STATE REGARDING FEDERALLY SPONSORED RESEARCH OR DEVELOPMENT

This invention was made with Government support under Agreement Number H98230-05-3-0001 awarded by Intelligence Agencies. The Government has certain rights in the invention.

BACKGROUND

1. Field of the Invention

The embodiments of the invention provide methods, computer program products, etc. for autonomic retention classes when retaining data within storage devices.

2. Description of the Related Art

Storage ingestion rates are very high in large clustered system storage environments. This causes finite storage resources to be constrained. The amount of accumulated data is so large that there is a need to prioritize the data that is actually stored within the system. Large clustered storage environments are becoming more common in larger contemporary storage area network (SAN) and network-attached storage (NAS) systems (e.g., SAN.FS deployment in CERN).

With the growing need for storage consolidation, applications compete amongst themselves for resources in the shared storage architecture. The cumulative resource requirements of such applications far exceed what the storage system is capable of supporting. It is thus required to assign a "priority value" to the data generated by different applications—the assignment should be generated in an automated fashion, with minimal human intervention. Existing approaches in this domain are primarily based on understanding the semantics of the data (i.e., the data is an image of a gold mine or a new article for alternative medicine). This approach is error-prone, limited, and relatively manual. The term "resource" is instantiated as capacity herein, but the concepts are equally applicable to storage performance bandwidth.

SUMMARY

The embodiments of the invention provide autonomic retention classes (ARC) comprising a framework that uses a combination of data semantics and run-time access attributes to assign an importance value to a stored object. The importance value is represented as a K-linear mathematical function that defines change in the value of the object as a function of its age—the storage system discards objects whose value falls below a certain global threshold. The working of ARC is briefly described as follows: first, it collects statistics about the data-objects being accessed in the storage system. The monitored data is analyzed to derive common access attributes of these objects, accomplished by using a K-means clustering method (and its variants).

Second, ARC maps the K-clusters into K-linear functions that represent a retention class (RC)—the slope of the linear function is inversely proportional to the density of the clusters, and the cluster centroid as well its diameter significance the bounds for the K-linear function (shown diagrammatically in FIG. 1). Third, the value of the object is a weighted sum of the value deduced using data semantics and that derived using access attributes—the weights are a function of the confidence value that the administrators or analytics module has on the value deduced after looking at the contents (e.g., unknown picture collected from the Mars)—a lower confidence value translates to assigning a higher weight to the value deduced based on access attributes.

The embodiments of the invention provide methods, computer program products, etc. for autonomic retention classes when retaining data within storage devices. More specifically, a method of determining whether to retain data within at least one storage device begins by storing data items in at least one storage device. Furthermore, the method maintains access statistics for each of the data items, an age of each of the data items, and an administrator-defined importance value of each of the data items. Following this, a retention value is calculated for each of the data items based on the access statistics for each of the data items, the age of each of the data items, and the administrator-defined importance value of each of the data items.

Specifically, the retention value is calculated by creating clusters of data points, wherein each of the data points comprise a function of data item age and data item number of accesses. Next, the clusters are mapped into linear functions. The linear functions are created such that the linear functions comprise slopes that are inversely proportional to densities of the clusters, and such that coordinate ranges of the linear functions correspond to diameters of the clusters. The linear functions are combined with the administrator-defined importance value of each of the data items in an adjustable weighted function. Subsequently, data items are removed that have a retention value below a predetermined value from the storage device.

Accordingly, a framework for combining the semantic value of data with access statistics semantics is provided. Specifically, patterns in the access characteristics are detected and translated into k-linear retention functions. Changes in data creation rates and available storage space (especially during failures) are adapted to. Moreover, automated adjustment in the weight of the access statistics value in the retention function is provided. Additional storage-level semantics can be incorporated; and, human readable visualization is permitted for correlation between data-semantics value and the actual access behavior.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIG. 3 illustrates the data structure and API for collected statistics;

DETAILED DESCRIPTION OF PREFERRED EMBODIMENTS

Figure 1:
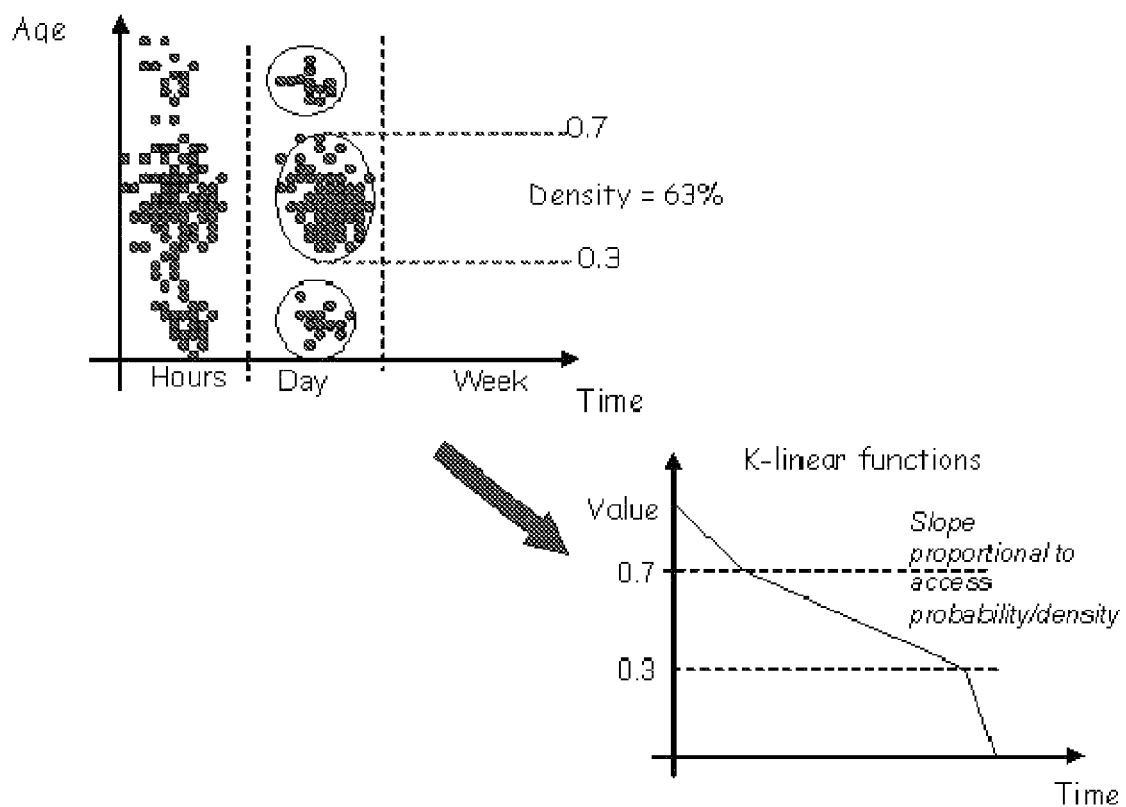
FIG. 1 illustrates mappings patterns in access characteristics for tuning the retention function.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

A framework for combining the semantic value of data with access statistics semantics is provided. Specifically, patterns in the access characteristics are detected and translated into k-linear retention functions. Changes in data creation rates and available storage space (especially during failures) are adapted to. Moreover, automated adjustment in the weight of the access statistics value in the retention function is provided. Additional storage-level semantics can be incorporated; and, human readable visualization is permitted for correlation between data-semantics value and the actual access behavior.

ARC comprises a framework that uses a combination of data-semantics and access statistics to assign a value to the data (referred to as "retention class" or "RC"). An RC is a mathematical function that defines change in the value of the data as a function of its age—the storage system discards the data whose value falls below a certain threshold (referred to as the "waterline"). ARC is based on the assumption that there is typically a correlation between the value of the data and its access probability—the more important the data, the higher the probability that it will be accessed.

In a formulation, an RC is represented as a piecewise linear function consisting of k-linear functions. The working of ARC is briefly described as follows: First, it collects statistics about the data-objects being accessed in the storage system. The monitored data is analyzed to derive common access attributes of these objects, accomplished by using a K-means clustering method (and its variants). Second, ARC maps the K-clusters into K-linear functions that represent an RC—the slope of the linear function is inversely proportional to the density of the clusters, and the cluster centroid as well its diameter significances the bounds for the K-linear function (shown diagrammatically in FIG. 1). Third, the weight of the value deduced is balanced using data-semantics and that derived using access. ARC also allows administrators to specify the level of confidence in the data-semantics value—when he has no presumptions about the data, he might decide to trust the fact the data is useful if it is accessed by any of the applications.

A concrete example for understanding the working is provided in FIG. 1: ARC samples all the objects being accessed on a per-RC basis; it uses K-means clustering to understand if there is pattern. In the example, 63% of the objects accessed were in the age range of 0.7 to 0.3. ARC uses these patterns to decide and refine the RC. Thus, the value of the objects in the age range of 0.7 to 0.3 should degrade slower. This is represented by the slope of the K-linear function (RC curve). The slope is lower (takes more time to degrade) between the age range of 0.7 to 0.3. This is a simplified example—it is possible to enhance this example with additional mapping heuristics as well as application semantics.

Figure 2:
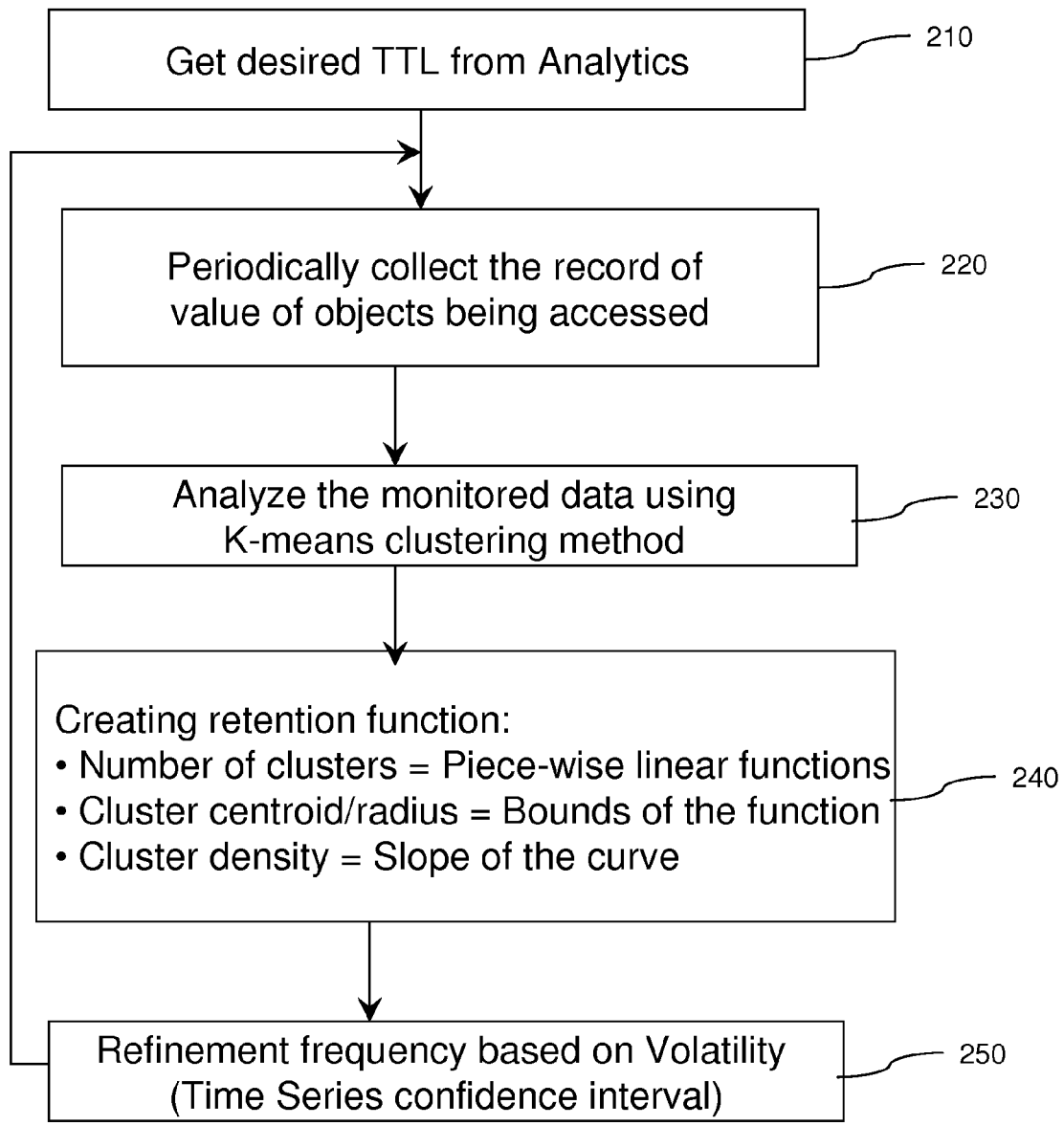
FIG. 2 is a flow diagram illustrating a method for autonomic retention classes.

The flowchart for ARC is shown in FIG. 2. The working can be divided into monitoring, analysis, and refining. More specifically, monitoring collects access statistics from the system. This involves getting desired time to live (TTL) from analytics (item 210) and periodically collecting the record of value of objects being accessed (item 220).

Analysis mapping the K-clusters of monitor data to the K-linear functions of the retention functions. This includes analyzing the monitored data using the K-means clustering method (item 230). The retention function is created (item 240) wherein the number of clusters equal the piece-wise linear functions. The cluster centroid/diameter are the bounds of the function. Moreover, the cluster density is the slope of the linear function curve. Refining derives the final retention curve based on the weighted sum of the data-semantic value and the access statistics value. The refinement frequency is based on volatility (time series confidence interval) (item 250). Analysis and refining are then repeated.

Embodiments herein assign data to multiple retention classes based on the type of data it is, i.e. what it's source was, what it's content is, what other data it is related to, etc. Next, various data classifications have retention functions assigned to them. Retention functions describe the desired retention rate of data based on age, i.e. how long the data has existed in the system. Retention functions are generated based on expected rates of data arrival, the amount of space that is available and the expected duration to keep data for each data classification and the priority of keeping one classification of data versus the other classifications. Assigning retention functions to the various data classifications can be a challenging problem in itself. In particular, it is desirable that data that is stored is kept around for a sufficient period of time so that it is still accessible when the demand for the data actually occurs.

Retention functions are generated based on expected rates of data arrival, the amount of space that is available, the expected duration to keep data for each data classification, and the priority of keeping one classification of data versus the other classifications. As the rates of ingestion of various data types varies, the effectiveness of the retention functions changes. For example, if the amount of data that is intended to be kept a long period of time increases, the space available for data to be kept a shorter period of time can become scarce. Conversely, if more space is assigned to data being kept for a short period of time, it is possible that data intended to be held for longer periods of time may not be held nearly as long as desired.

Further complicating the classification of data is the ability to change the retention classification of individual objects or groups of objects which can rapidly shift the quantity of data assigned to the different classifications and thus impact the effectiveness of the curves. An additional complication is that the system can allow data to have its retention evaluation time adjusted, which means that an object or group of objects can dynamically have the time it appears they were created (effecting how long the system specifies the data has existed in the system). This can rapidly effect where data is along the curve and thus again impact the effectiveness of the curves.

The system can make dynamic adjustments to respond to shifts in the lifecycle of the data stored in the system. However, storage analysts can monitor the system and make further adjustments. A further challenge is to determine what data (that needs to be removed from the primary data store) can be moved to available tertiary storage and what data needs to be deleted.

In the monitoring phase, ARC collects information at the Distillery Object Store—this information is maintained on a per-RC basis and periodically flushed out in the log-file. The Distillery Object store is where data and attribute information is persistently stored as object and it facilitates autonomic storage management of those objects. Object Store resource information that is collected and measured includes the rate and average size of objects that are created and accessed, the size and frequency of updates to objects, the rate at which object requests cannot be satisfied that occurs due to autonomically managed storage having to reclaim and remove those resources, how often and by how much objects have their retention values adjusted, how often and by how much objects have their retention evaluation times adjusted, creation and retention values for Object Sets, frequency of access of specific Object Sets, as well as the rate of deletion of objects, segments of objects and whole Object Sets. The data structure and application program interface (API) for the collected statistics are given in FIG. 3.

The analysis phase analyzes the common attributes of the sampled data and tries to deduce patterns. The age of the objects in an RC that typically get accessed are determined. This information can help create an RC that preserves useful objects for a longer duration of time. Also, the number of times the RC value of an object is modified is an indication of its value.

Figure 4:
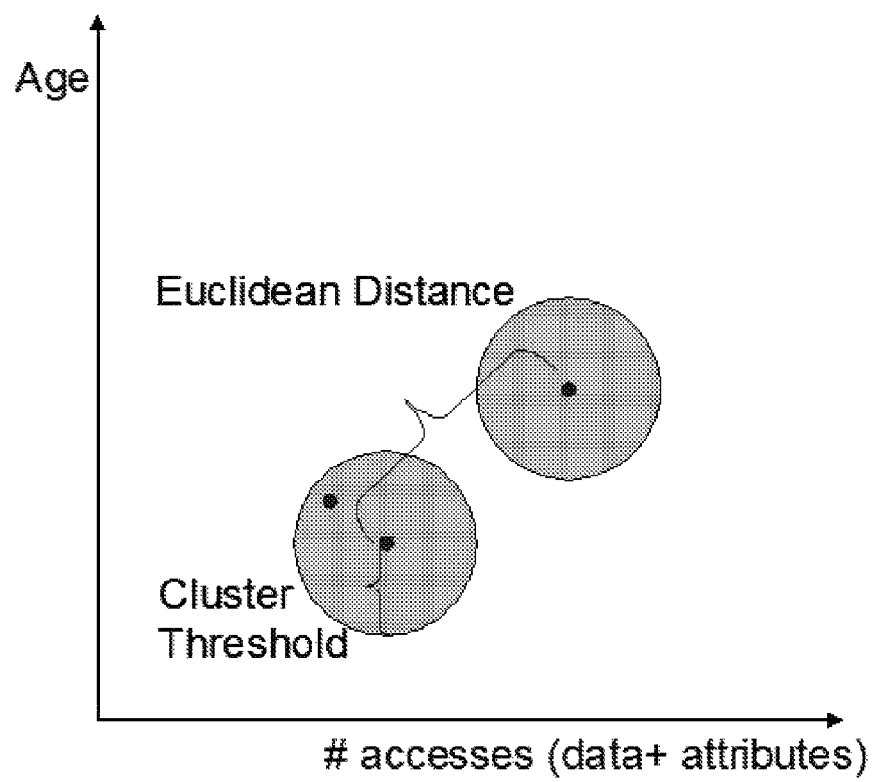
FIG. 4 is a diagram illustrating clustering to determine the patterns in the object accesses.

FIG. 4 illustrates the k-means clustering method used for analyzing the sampled data, wherein data points for data objects are plotted based on age and total number of accesses (data+attributes). A goal of clustering is to analyze common attributes for objects that exhibit a specific property (such as high number of changes in RC, high access rates, etc.). One of the known techniques is the sequential leader technique, which incrementally clusters the monitor data:

First, the number of clusters=k is chosen. For each new data point, the closest existing cluster is found. If the new data point is less than the Cluster Threshold from the center of the cluster, the new data point is added to the cluster. The center of the cluster is then re-computed. The distance function is based on the Euclidean formula. If the new data point is greater than the Cluster Threshold from the center of the cluster, a new cluster is created with the point at its center. This process has a space complexity of O(k), and a time complexity O(nk), where n is the number of points in the sample. The end result of clustering is K-clusters, where each cluster is represented a triplet of the form <d, c, t>. Specifically, d is the density of the cluster (% of n that falls within that cluster); and, c is the x and y coordinates for the cluster centroid—the coordinates represent age and number of accesses. Also, t is the threshold value for the cluster.

Figure 5:
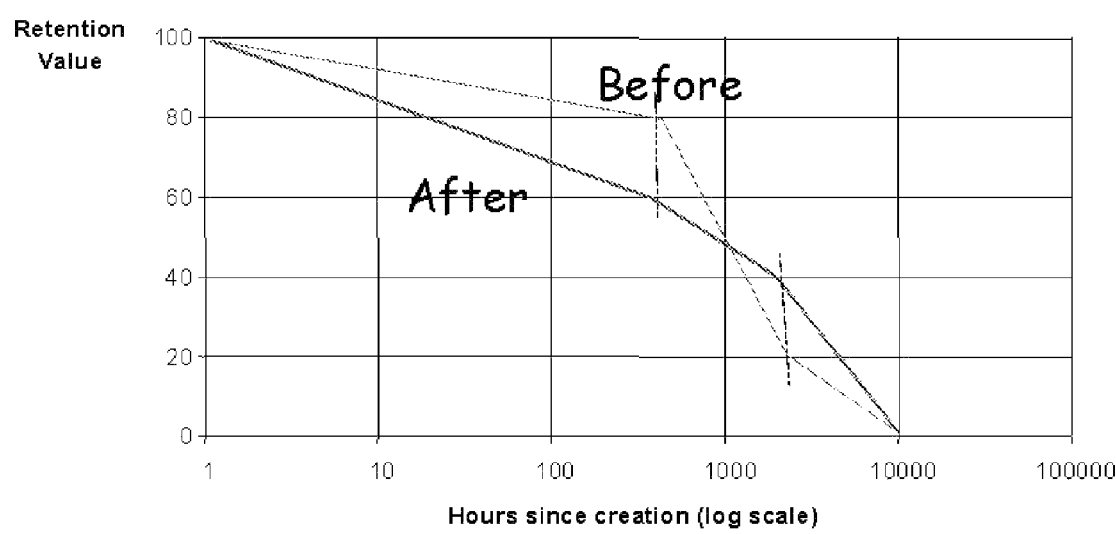
FIG. 5 is a graph illustrating retention value versus hours since creation.

In the refinement phase, the K-clusters generated from the previous step are mapped to create K-linear functions such that d is inversely proportional to the slope of the curve. Additionally, c±t represents the bounds of the linear function. In the terminology of RCs, this feedback allows to retune Intrinsic Value (IV) and Preshibility (P). FIG. 5 is a graph illustrating retention value versus hours since creation (log scale). It represents the changes in the retention function at run-time based on the access patterns. In the figure, the retention function consists of 3 linear functions—after refinement each of the functions can change differently based on the access pattern of data in different age ranges. This process of refining the retention functions is a continuous ongoing optimization process.

Thus, the embodiments of the invention provide methods, computer program products, etc. for autonomic retention classes when retaining data within storage devices. More specifically, a method of determining whether to retain data within at least one storage device begins by storing data items (also referred to herein as "objects") in at least one storage device. Furthermore, the method maintains access statistics for each of the data items, an age of each of the data items, and an administrator-defined importance value of each of the data items. As described above, the Distillery Object store is where data and attribute information is persistently stored. Object Store resource information that is collected and measured can include the rate and average size of objects (i.e., the data items) that are created and accessed, the size and frequency of updates to objects, the rate at which object requests cannot be satisfied that occurs due to autonomically managed storage having to reclaim and remove those resources, how often and by how much objects have their retention values adjusted, how often and by how much objects have their retention evaluation times adjusted, creation and retention values for Object Sets, frequency of access of specific Object Sets, as well as the rate of deletion of objects, segments of objects and whole Object Sets.

Following this, a retention value is calculated for each of the data items based on the access statistics for each of the data items, the age of each of the data items, and the administrator-defined importance value of each of the data items. Specifically, the retention value is calculated by creating clusters of data points, wherein each of the data points comprise a function of data item age and data item number of accesses. As described above, FIG. 4 illustrates the k-means clustering method used for analyzing the sampled data, wherein data points for data objects are plotted based on age and total number of accesses (data+attributes). A goal of clustering is to analyze common attributes for objects that exhibit a specific property (such as high number of changes in RC, high access rates, etc.).

Next, the clusters are mapped into linear functions. The linear functions are created such that the linear functions comprise slopes that are inversely proportional to densities of the clusters, and such that coordinate ranges of the linear functions correspond to diameters of the clusters. As described above, in the refinement phase, the K-clusters are mapped to create K-linear functions such that d is inversely proportional to the slope of the curve. Additionally, c±t represents the bounds of the linear function. In the terminology of RCs, this feedback allows to retune Intrinsic Value (IV) and Preshibility (P).

The method then combines the linear functions with the administrator-defined importance value of each of the data items in an adjustable weighted function. As described above, administrators are allowed to specify the level of confidence in the data-semantics value—when he has no presumptions about the data, he might decide to trust the fact the data is useful if it is accessed by any of the applications. Subsequently, data items are removed that have a retention value below a predetermined value from the storage device.

Figure 6:
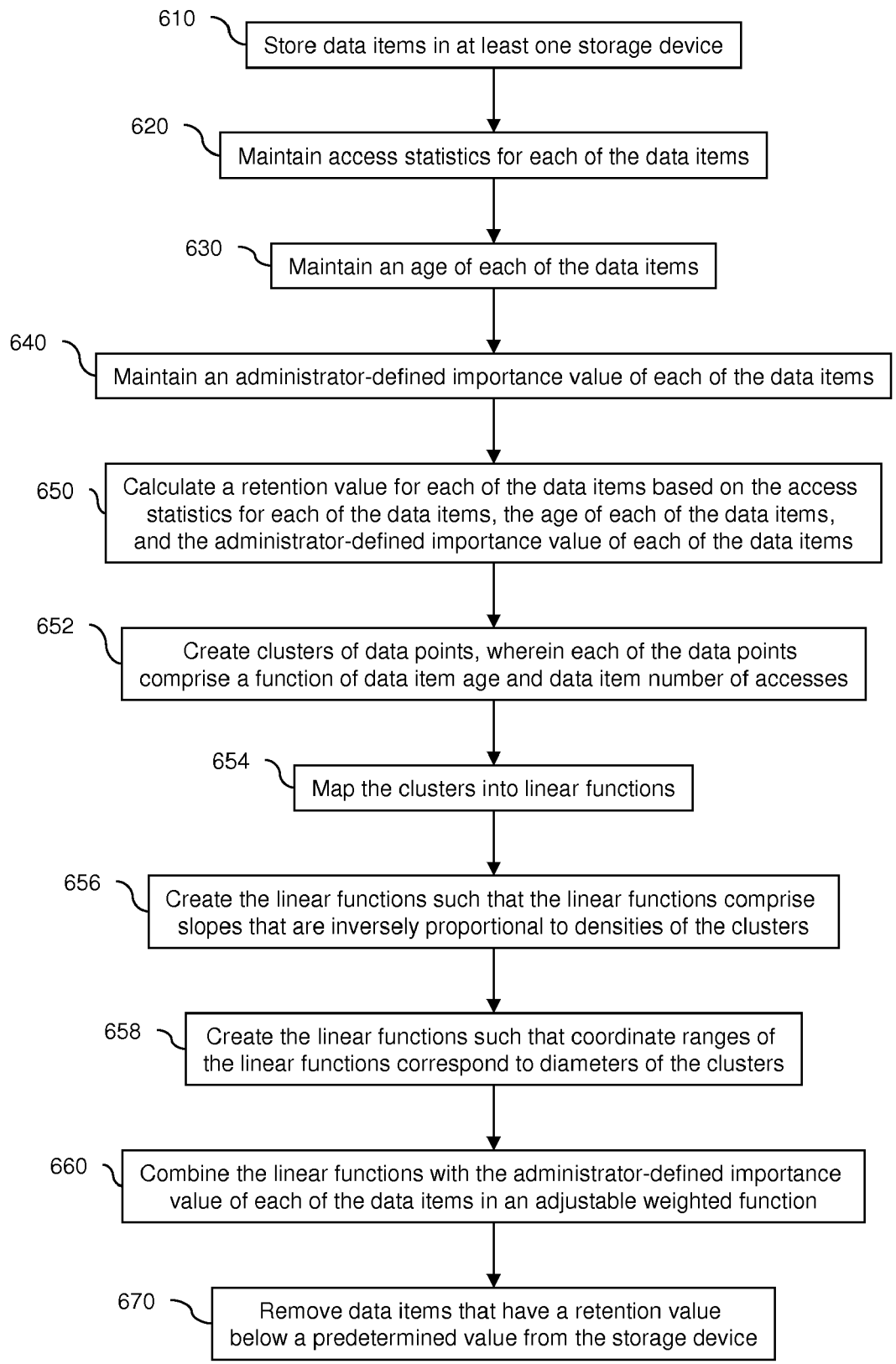
FIG. 6 is a flow diagram illustrating another method for autonomic retention classes when retaining data within storage devices.

FIG. 6 is a flow diagram illustrating a method for autonomic retention classes when retaining data within storage devices. The method begins in item 610 by storing data items in at least one storage device. Next, the method maintains access statistics for each of the data items (item 620), an age of each of the data items (item 630), and an administrator-defined importance value of each of the data items (item 640). As described above, Object Store resource information that is collected and measured can include the rate and average size of objects (i.e., the data items) that are created and accessed, the size and frequency of updates to objects, the rate at which object requests cannot be satisfied that occurs due to autonomically managed storage having to reclaim and remove those resources, how often and by how much objects have their retention values adjusted, how often and by how much objects have their retention evaluation times adjusted, creation and retention values for Object Sets, frequency of access of specific Object Sets, as well as the rate of deletion of objects, segments of objects and whole Object Sets.

Following this, in item 650, a retention value is calculated for each of the data items based on the access statistics for each of the data items, the age of each of the data items, and the administrator-defined importance value of each of the data items. This includes, in item 652, creating clusters of data points, wherein each of the data points comprise a function of data item age and data item number of accesses. As described above, a goal of clustering is to analyze common attributes for objects that exhibit a specific property (such as high number of changes in RC, high access rates, etc.).

Further, it item 654, the clusters are mapped into linear functions. This involves creating the linear functions such that the linear functions comprise slopes that are inversely proportional to densities of the clusters (item 656) and creating the linear functions such that coordinate ranges of the linear functions correspond to diameters of the clusters (item 658). As described above, in the refinement phase, c±t represents the bounds of the linear function. In the terminology of RCs, this feedback allows to retune Intrinsic Value (IV) and Preshibility (P).

Next, in item 660, the linear functions are combined with the administrator-defined importance value of each of the data items in an adjustable weighted function. As described above, administrators are allowed to specify the level of confidence in the data-semantics value. Subsequently, in item 670, data items that have a retention value below a predetermined value are removed from the storage device.

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
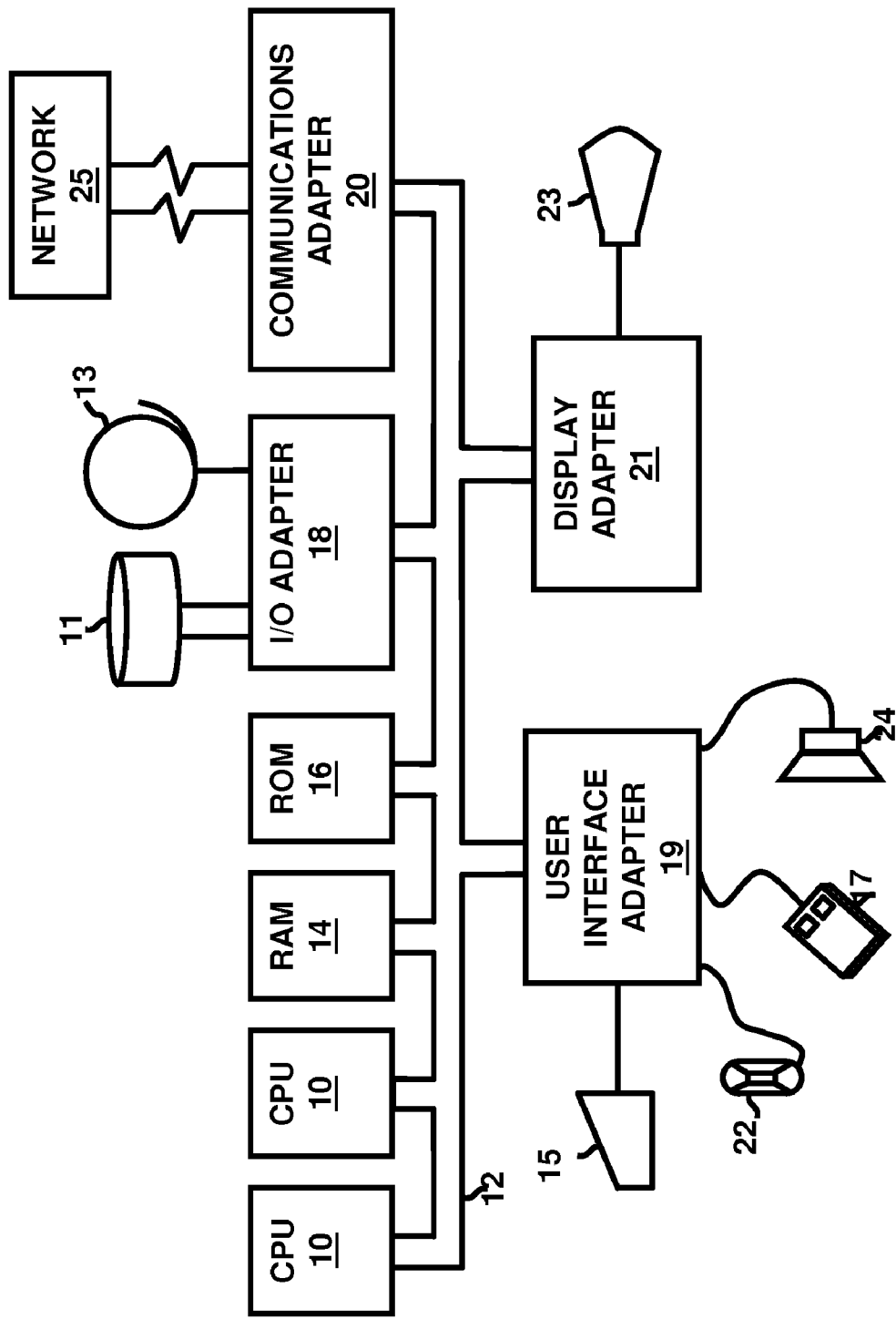
FIG. 7 is a diagram illustrating a computer program product for autonomic retention classes when retaining data within storage devices.

A representative hardware environment for practicing the embodiments of the invention is depicted in FIG. 7. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Accordingly, a framework for combining the semantic value of data with access statistics semantics is provided. Specifically, patterns in the access characteristics are detected and translated into k-linear retention functions. Changes in data creation rates and available storage space (especially during failures) are adapted to. Moreover, automated adjustment in the weight of the access statistics value in the retention function is provided. Additional storage-level semantics can be incorporated; and, human readable visualization is permitted for correlation between data-semantics value and the actual access behavior.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A method of determining whether to retain data within at least one storage device, said method comprising:
    storing data items in at least one storage device;
    maintaining access statistics for each of said data items;
    maintaining an age of each of said data items; and
    calculating a retention value for each of said data items based on said access statistics for each of said data items and said age of each of said data items,
    wherein said calculating of said retention value comprises creating clusters of data points, wherein each of said data points comprise a function of data item age and data item number of accesses.

2. The method according to claim 1, wherein said calculating of said retention value further comprises mapping said clusters into linear functions.

3. The method according to claim 2, wherein said mapping of said clusters into said linear functions comprises creating said linear functions such that said linear functions comprise slopes that are inversely proportional to densities of said clusters.

4. The method according to claim 2, wherein said mapping of said clusters into said linear functions comprises creating said linear functions such that coordinate ranges of said linear functions correspond to diameters of said clusters.

5. The method according to claim 1, further comprising removing data items that have a retention value below a predetermined value from said storage device.

6. A method of determining whether to retain data within at least one storage device, said method comprising:
    storing data items in at least one storage device;
    maintaining access statistics for each of said data items;
    maintaining an age of each of said data items; and
    maintaining an administrator-defined importance value of each of said data items;
    calculating a retention value for each of said data items based on said access statistics for each of said data items, said age of each of said data items, and said administrator-defined importance value of each of said data items,
    wherein said calculating of said retention value comprises creating clusters of data points, wherein each of said data points comprise a function of data item age and data item number of accesses.

7. The method according to claim 6, wherein said calculating of said retention value further comprises mapping said clusters into linear functions.

8. The method according to claim 7, wherein said mapping of said clusters into said linear functions comprises creating said linear functions such that said linear functions comprise slopes that are inversely proportional to densities of said clusters.

9. The method according to claim 7, wherein said mapping of said clusters into said linear functions comprises creating said linear functions such that coordinate ranges of said linear functions correspond to diameters of said clusters.

10. The method according to claim 7, wherein said calculating of said retention value further comprises combining said linear functions with said administrator-defined importance value of each of said data items in an adjustable weighted function.

11. The method according to claim 6, further comprising removing data items that have a retention value below a predetermined value from said storage device.

12. A computer program product comprising computer readable program code stored on computer readable storage medium embodied therein for performing a method of determining whether to retain data within at least one storage device, said method comprising:
    storing data items in at least one storage device;
    maintaining access statistics for each of said data items;
    maintaining an age of each of said data items;
    maintaining an administrator-defined importance value of each of said data items; and
    calculating a retention value for each of said data items based on said access statistics for each of said data items, said age of each of said data items, and said administrator-defined importance value of each of said data item,
    wherein said calculating of said retention value comprises creating clusters of data points, wherein each of said data points comprise a function of data item age and data item number of accesses.

13. The computer program product according to claim 12, wherein said calculating of said retention value further comprises mapping said clusters into linear functions.

14. The computer program product according to claim 13, wherein said mapping of said clusters into said linear functions comprises creating said linear functions such that said linear functions comprise slopes that are inversely proportional to densities of said clusters.

15. The computer program product according to claim 13, wherein said mapping of said clusters into said linear functions comprises creating said linear functions such that coordinate ranges of said linear functions correspond to diameters of said clusters.

16. The computer program product according to claim 13, wherein said calculating of said retention value further comprises combining said linear functions with said administrator-defined importance value of each of said data items in an adjustable weighted function.

17. The computer program product according to claim 12, further comprising removing data items that have a retention value below a predetermined value from said storage device.

* * * * *